Jan. 29, 1946.                J. D. WALKER                2,393,725
                        SLUDGE COLLECTING MECHANISM
                           Filed Oct. 22, 1943
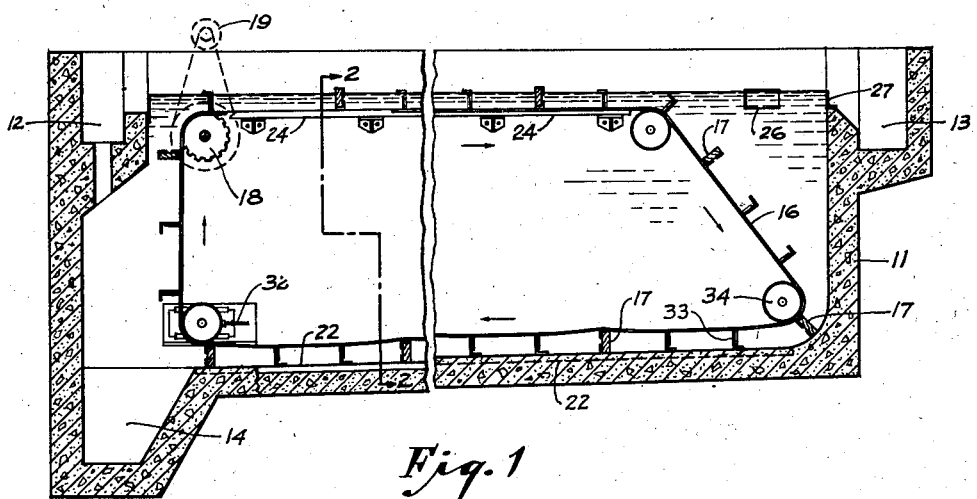
Fig. 1
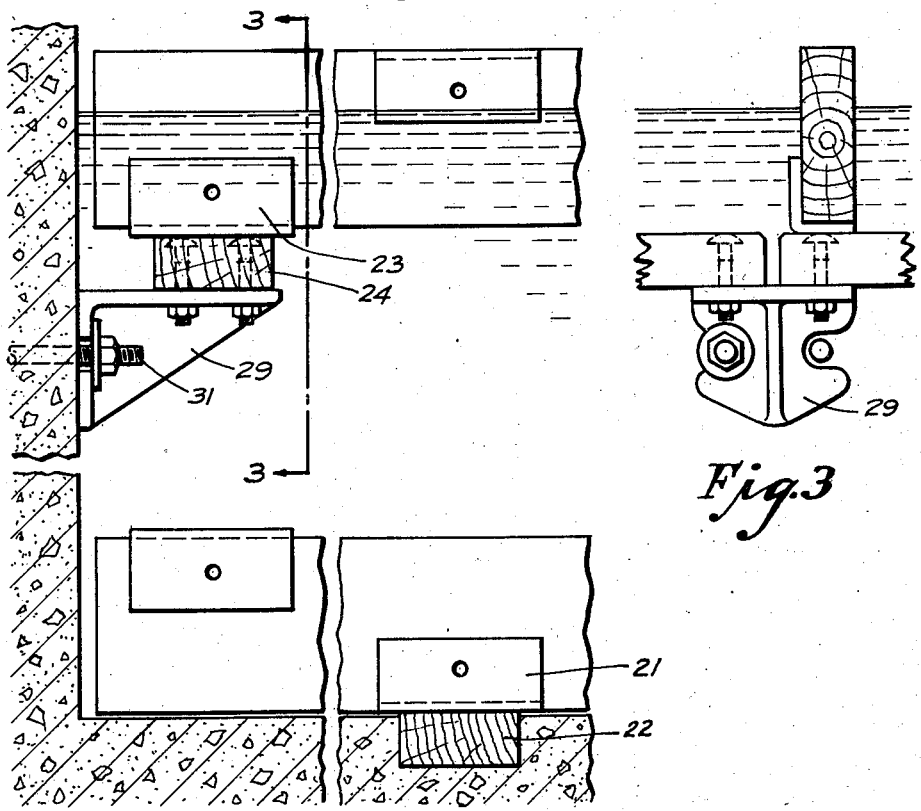
Fig. 2
Fig. 3
INVENTOR.
James D. Walker
BY
Mann, Brown &
    Att'ys Patented Jan. 29, 1946

2,393,725

UNITED STATES PATENT OFFICE 2,393,725

SLUDGE COLLECTING MECHANISM

James D. Walker, Aurora, Ill., assignor to The American Wheel Works, a corporation of Illinois Application October 22, 1943, Serial No. 507,285

5 Claims. (Cl. 210—55)

In treating sewage, the sewage is treated by any of a variety of processes to flocculate the solids in the mixture and to convert dissolved matter to insoluble solids. Both before and after such treatment, the solids are settled from the liquid in a settling tank. Because of the large volumes handled, a large settling tank is required and according to common practice, a collecting mechanism is provided for moving the solids which settle along the bottom of the tank to one end of the tank so that they may be more easily removed.

The collecting mechanism commonly consists of a series of transverse bars or flights which are dragged along the floor of the tank by endless chains, the return run of which carries the flights back to the end of the tank at which their collecting movement starts. Quite often the return run of the flights is used for moving scum along the tank toward a scum trough at one end thereof. The flights are usually supported during the return run by rails, one along each side of the tank on which the ends of the flights move. The flights moving along the bottom of the tank have commonly been supported by rails embedded in the concrete.

It has long been recognized that the use of such collecting mechanism disturbed the settling process even though the mechanism were run extremely slowly. The practice has been to run the collecting mechanism only periodically so that liquor in the tank would be as quiescent as possible during the remainder of the time. The disturbing action has been especially noticeable in connection with the common activated sludge sewage treating systems in which the solids being settled are of an extremely light type very easily caught up by a very minute swirl of the water. This undesirable agitation of the contents of the settling tank has been regarded as an unavoidable accompaniment in the necessary use of collecting mechanisms.

According to the present invention, this undesirable agitation is greatly reduced. Applicant has determined that the agitation is not due to the average speed of the flights but rather due to momentary high speeds due to irregular movement. Applicant has even determined that in some instances, increasing the speed would decrease the agitation because it prevented the irregular movement of the flights. According to the present invention, the undesired agitation has been reduced without such speed-up of the flights by avoiding the metal to metal sliding engagement which applicant has determined to have been the chief cause of the irregularity in the past.

It is probably necessary, and has been so regarded, to provide steel wear shoes on the flights where they engage either the return rails or the main rails embedded in the bottom of the tank. It has also been considered necessary to have the rails themselves of steel. According to the present invention, however, wooden rails are used. Applicant has determined that the characteristics of the metal wear plates sliding on the wet wood rails is so superior to that of steel on steel that the wear on the wood is negligible and the irregularity of movement is substantially avoided.

Additional objects and advantages will become apparent as the disclosure proceeds and the description is read in conjunction with the accompanying drawing, in which Fig. 1 is a longitudinal, vertical, sectional view, largely diagrammatic, of the form of the invention chosen for illustration;

Fig. 2 is a fragmentary, sectional view taken approximately on the line 2—2 of Fig. 1, the scale being greatly enlarged as compared to Fig. 1;

Fig. 3 is a fragmentary, sectional view taken approximately on the line 3—3 of Fig. 2.

A preferred form of the invention has been chosen for illustration and description, in compliance with Section 4888 of the Revised Statutes, but persons skilled in the art will readily perceive other means utilizing the invention for accomplishing the same results, and I do not, therefore, limit myself to the precise details of construction herein described except in so far as defined in the appended claims.

The invention has been illustrated in connection with a settling tank 11 having an intake channel 12 and effluent channel 13 and a sludge sump 14, all of which may be of any conventional form.

The invention is concerned with the collecting mechanism, the moving parts of which are conventional. The collecting mechanism includes a pair of chains 16, one on either side of the tank, the chains carrying between them a series of flights 17. These flights are wooden bars or boards which are drawn along the bottom of the tank by the chains so as to slide the settling sludge along the bottom and push it into the sump 14. Each chain is driven by a sprocket 18, the two sprockets being jointly driven by a motor 19.

Each flight is provided along one edge with a pair of wear shoes 21, each of which slides on a main rail 22 embedded in the concrete bottom of the tank. Heretofore the rails 22 have been made of steel. According to the present invention, they are made of wood with special advantages mentioned hereinafter.

Each flight is also provided with a pair of wear shoes 23 near its end and along its other edge, these wear shoes being adapted to slide on return rails 24. Heretofore the return rails have been made of steel but according to the present invention, they are made of wood, again with advantages hereinafter mentioned.

As in the illustrated form, it is common to position a return rail 24 at such height that the flights supported thereon will project slightly above the surface of the liquor in the tank 11 so that any surface scum will be moved by them toward the outlet of the tank or the scum trough 26. The level of the liquor in the tank may be determined by a weir 27 which may be adjustable.

The rails 24 may be supported in any suitable manner. For example, they may be mounted on cast iron brackets 29 which are secured by bolts 31 embedded in the concrete wall of the tank. The rails need not be continuous, but if not, they should be beveled slightly at their corners so that the flights will be sure to pass from one to the other smoothly. Likewise the end of the first rail is preferably deeply beveled at an angle of say 30 degrees from the horizontal so that there will be no danger that the flights will catch at the ends thereof.

The rails 22 may be secured in any suitable manner. It is contemplated that in initially laying the rough concrete, other channels will be formed for the rails 22 by temporary boards. The rails will be secured and accurately positioned in the channels by grouting. In this process, the rails may be carefully levelled or carefully trued to the desired slope. These rails may be used as a guide in smoothing off the layer of concrete, the surface of which may be one-eighth of an inch below the surface of the rail.

The rails 22 and 24 may be approximately 2" x 4", preferably with the wider sides up. The rails should be edge grain wood, the surfaces of the grain being generally perpendicular to the upper rail surface, and the grain running longitudinally of the rail. Redwood (sequoia) is especially suitable for the rails and it has been found to have a very long life in service. Cypress may also be used.

The most important advantage in using wood for the rails 22 and 24 in place of metal is in minimizing the disturbance of the settling process. The frictional characteristic of the metal wear shoes on the wet wood is very much more satisfactory than metal on metal. Applicant has determined that the metal on metal has often caused irregular movement of the flights. Surprisingly, he has found he can sometimes decrease the undesired agitation by speeding up the nominal speed of movement of the flights so that they do not start and stop. The irregularity is apparently due in part to catenaries in the chain (the sagging of the chain between points of suspension) which permit the flights to stop momentarily until their static friction is overcome by straightening out the catenaries whereupon the stored up energy in the catenaries pulls the flights ahead suddenly with a speed considerably in excess of the average speed. The steel wear plates 21 and 23 on the smooth wet wood 22 and 24 minimizes this tendency and in fact eliminates the occurrence except at extremely slow speeds. Slower speeds are permitted without this erratic movement than have ever been maintained before. In this way, the undesirable agitation of the tank due to the operation of the collector is greatly reduced and the efficiency of the tank is accordingly increased.

It is, of course, desirable to minimize the catenary characteristics of the conveyor. For this reason, any conventional chain tightening mechanism 32 may be provided. Also the chains are preferably provided with intermediate supports 33 which slide on the rail 22 as disclosed in my Patent No. 2,309,556.

Of course it is desirable to avoid other sources of disturbing the settling process. To this end, the idler wheels or sprockets are carried by stub shafts, as also described in said patent, so that the disturbing influence which would result from the catenaries of shafts extending across the tank is avoided.

I claim:

1. Sludge collecting mechanism for settling tanks including endless chain means, aligned sprockets spaced from one another supporting said chain means, means for driving the chain means, flights carried by the chain means, edge-grain wooden rail means positioned in the tank below the water level thereof, and metal wear shoes carried by the flights and sliding on said rail means substantially parallel to the grain thereof to support the flights.

2. Sludge collecting mechanism for settling tanks including endless chain means, aligned sprockets spaced from one another supporting said chain means, means for driving the chain means, flights carried by the chain means, wooden rail means positioned in the tank below the water level thereof along an upper run of the chain means, and metal wear shoes carried by the flights and sliding on said rail means substantially parallel to the grain thereof to support the flights.

3. Sludge collecting mechanism for settling tanks including endless chain means, aligned sprockets spaced from one another supporting said chain means, means for driving the chain means, flights carried by the chain means, wooden rail means positioned in the tank below the water level thereof along an upper run of the chain means, additional wooden rail means embedded in the floor of the tank and exposed thereabove, and metal wear shoes carried by the flights and sliding on said rail means substantially parallel to the grain thereof to support the flights.

4. A sludge collecting mechanism for a settling tank including endless chain means, aligned sprockets spaced from one another supporting said chain means, means for driving the chain means, flights carried by the chain means, rail members disposed to support the flights, and wear members on the flights having sliding engagement with said rail members, at least one of said members being of wood with the grain thereof disposed substantially parallel to the path of the flights.

5. Sludge collecting mechanism for settling tanks including endless chain means, aligned sprockets spaced from one another supporting said chain means, means for driving the chain means, flights carried by the chain means, wooden rail means positioned in the tank below the water level thereof along a lower run of the chain means, and metal wear shoes carried by the flights and sliding on said rail means substantially parallel to the grain thereof to support the flights.

JAMES D. WALKER.